(12) United States Patent
Darling

(10) Patent No.: US 9,451,245 B1
(45) Date of Patent: Sep. 20, 2016

(54) THREE DIMENSIONAL DIGITIZING AND PROJECTOR SYSTEM

(71) Applicant: Ryan Franklin Darling, Tucson, AZ (US)

(72) Inventor: Ryan Franklin Darling, Tucson, AZ (US)

( * ) Notice: Subject to any disclaimer, the term of this patent is extended or adjusted under 35 U.S.C. 154(b) by 0 days.

(21) Appl. No.: 14/590,978

(22) Filed: Jan. 6, 2015

(51) Int. Cl.
*H04N 13/04* (2006.01)
*G06T 19/00* (2011.01)
*G06T 19/20* (2011.01)

(52) U.S. Cl.
CPC ......... *H04N 13/0459* (2013.01); *G06T 19/006* (2013.01); *G06T 19/20* (2013.01); *G06T 2219/2004* (2013.01); *G06T 2219/2012* (2013.01)

(58) Field of Classification Search
CPC ................. G06K 19/06037; G06K 19/06159; G06K 7/10732; H04N 13/0459; G06T 19/006; G06T 19/20
USPC ........................................................... 345/9
See application file for complete search history.

(56) References Cited

U.S. PATENT DOCUMENTS

| | | | | |
|---|---|---|---|---|
| 7,715,020 | B2 * | 5/2010 | Yamaguchi | G01B 11/2518 356/601 |
| 9,058,533 | B2 * | 6/2015 | Fedorovskaya | G06K 9/2036 |
| 2014/0361072 | A1 * | 12/2014 | Fedorovskaya | G06K 9/2036 235/375 |

* cited by examiner

*Primary Examiner* — Fred Tzeng
(74) *Attorney, Agent, or Firm* — Invention To Patent Services; Alex Hobson

(57) ABSTRACT

A digitizing projector system is configured in a single housing and comprises a digitizer and a projector. The position of the scanner and projector relative to each other are known by a software function. A scanner projector system has a digitizer configured to scan any shaped object or scene to produce a digitized scaled 3D digital image or digitized file. The software will identify surfaces including planar and non-planar surfaces, geometric surfaces and shapes, irregular surfaces, edges and noisy surfaces. A projected image may comprise one or more image files that are projected onto one or more identified surfaces of the object. A user may edit an image file in shape, color, orientation, and may input motion effects or dynamic functions of the image. The digitizing projector system may be self-calibrated for are offset in position from a first location to a second location.

22 Claims, 19 Drawing Sheets

THREE DIMENSIONAL DIGITIZING AND PROJECTOR SYSTEM

BACKGROUND OF THE INVENTION

1. Field of the Invention

The present invention relates to digitizing projector system.

2. Background

Three dimensional (3D) projection mapping technology is not easily accessible to the average consumer or business due to the complicated methods involved. In order to produce spatially correct projections on any shaped surface, an exact virtual model of the scene must be used. Utilizing 3D laser digitizer or (LiDAR) to digitize the scene is an effective method for generating a virtual model or 3D digitized object file. 3D digitizers and projectors require a lot of effort to properly position and set-up for projection mapping projects. Digitizers and projectors are typically separate devices and any movement of the projector after setting up the system can misplace projected images on surfaces. A new scan of the object or a new rendering may be required. In addition, there are no integrated systems that allow a user to easily set up a device that digitizes the scene, allows them to create art or productions in the virtual scene and then easily and accurately project the art into the physical scene.

SUMMARY OF THE INVENTION

The invention is directed to a digitizing projector system that, in an exemplary embodiment, is configured in a single housing, wherein the position of the scanner and projector relative to each other is known by a software function using an on-board processor and memory. An exemplary scanner projector system comprises a digitizer configured to scan any shaped object or scene and produce a digitized scaled 3D digital image or digitized file. The processor may implement software or any number of algorithms to produce a 3D model or a 3D digital image file of the digitized object or scene. The software will identify surfaces including planar and non-planar surfaces, geometric surfaces and shapes, irregular surfaces, edges and noisy surfaces. A surface may be contoured, such as the curved surface of an automobile, or may be planar, such as the wall or roof of a house. A digitizing projector system may identify the edges of surfaces including planar, non-planar and noisy surfaces. In still another embodiment, a digitizing projector system may identify noisy surfaces, or regions not well defined, or having high noise, such as bushes or trees. A digitizing projector system is configured to project images onto the surfaces as described herein and these images may be still or moving images. In an exemplary embodiment, a user interface enables a user to modify the size, shape, position, color, and dynamic features of a projected image. In another embodiment, a motion sensor is coupled with the digitizing projector system to enable a dynamic image to be projected as a function of an input from the motion sensor. In still another embodiment, a speaker is coupled with the digitizing projector system and is configured to play a sound file that corresponds with a projected image including an activated image from a motion sensor. In yet another embodiment, a digitizing projector system comprises a calibration feature and/or algorithm to enable a saved 3D digitized object file to be used to calibrate a new position of the digitizing projector system. A calibration feature enables the quick offset of a projected image to correspond with an offset position of the digitizing projector system from a previous location.

Any suitable 3D digitizer may be incorporated into the digitizing projector system as described herein, including, a 3D laser scanner or a time-of-flight camera, or a flash LiDAR. A digitizing projector system may be configured to identify different types of surfaces including, but not limited to, planar surfaces, geometric surfaces, irregular surfaces, noisy surfaces and edges. A planar surface is a surface that is substantially flat such as a wall or roof, for example. A geometric surface is a surface of a common type of geometry including, but not limited to, a rod or cylinder, a sphere, a cone, a cube or box, and the like. An irregular surface may be a complex combination of geometric surfaces and/or planar surfaces or may be a contiguously irregular surface having curved surfaces and/or planar surfaces that interconnect. An example of an irregularly shaped surface may be a sculpture or some portions of a motor vehicle. A noisy surface is a surface that has relatively large variations is depth, such as the foliage of a bush or tree. The foliage will produce a noisy signal due to the change in depth measured by the scanner and due to motion of the foliage.

In another embodiment, a 3D digitized object file may be loaded into the digitizing projector system. For example, a 3D computer automated design, CAD, file having all of the data for an object or surface may be loaded into the digitizing projector system, and the digitizing projector system may then calibrate this file according to an actual scan of a corresponding object, which may be a simplified scan of the object.

A planar surface may be of any suitable size including, but not limited to, about 25 $cm^2$ or larger, about 50 $cm^2$ or larger, about 100 $cm^2$ or larger, about 500 $cm^2$ or larger, about 0.1 $m^2$ or larger, about 1 $m^2$ or larger, about 10 $m^2$ or larger, about 100 $m^2$ or larger and any range between and including the sizes provided. Planar surfaces may be walls, roofs, windows, doors, and the like.

A digitizing projector system may be configured to identify edges of a surface including the edge between planar surfaces or the outside edge of a planar surface. An edge may be identified as the change in depth that is greater than a preset limit along a surface. An edge of a noisy surface or contoured surface may be identified by a change in depth as well. A noisy surface is a digitized region that has a high level of noise, such as that produced from a tree, grass, bush or shrub. A 3D digitizer will detect change in depth and scattering of signals when digitizing these types of surfaces and therefore have a lot of noise.

A digitizer projector system may comprise a field of view camera that is used to produce an actual view display image. A digitized image may be shown on a display screen along with an actual view display image for the purpose of calibrating the position of the digitizing projector system.

A digitizing projector comprises a processor that utilizes software and/or any number of algorithms for operating the system, receiving inputs including a 3D digitized object file, user inputs and the like. A processor may comprise a position calibration algorithm that can be used to modify a projected image onto an object, wherein the object was previously digitized and a saved digitized object file is loaded, for example. In one embodiment, a position calibration algorithm is an automatic position calibration algorithm, wherein a user simply loads a saved digitized object file and then runs a calibration scan. The scan of the object may be shorter than the original scan time. An original scan of an object to create a saved 3D digitized object file may take a considerable amount of time, however a calibration scan may scan only a portion of the object or scan at a lower resolution to enable the identification of surfaces that can be compared with a surface from the saved 3D digitized object file. The processor may then determine the offset between the calibration digitized surface and the saved digitized surface and create an offset for a projected image.

In another embodiment, a calibration feature enables a user to utilize a view display image to compare with a saved 3D digitized object file. For example, a person may locate the digitizing projector system, load a saved 3D digitized object file for display on a display screen along with a view display image. In an alternative embodiment, a display produced from a new scan of the object or calibration scan of the object is shown along with the image produced from the saved 3D digitized object file. The user may then input an offset by dragging the saved image to correspond substantially with the view display image, or calibration scan image, for example. A person may move the saved digitized image within the display by selecting and dragging the saved digitized image, may rotate the image, or resize the image. A position calibration algorithm may record the user's input and change the projected image accordingly to substantially overlay on the recognized surfaces of the object in a correct location.

In yet another embodiment, a digitizing projector system comprises a calibration feature that utilizes one or more targets to calibrate the location of the digitizing projector system with a previous position. A user may set up the digitizing projector system and scan an object to create a first 3D digitized object file having one or more recognized surfaces and subsequently create a projection image file that includes information defining one or more images and the location of these images with respect to the recognized surfaces of the object. A projection image file may also contain subroutines for moving projected images across a recognized surface or from one surface to another surface, image dynamics and/or audio output. In another embodiment, a projection image file comprises image dynamics and/or audio output that is initiated by a motion sensor. A projection image file is the file or computer algorithm that controls the projection of an image or images onto the one or more recognized surfaces of a digitized object. A user creates a projection image file by utilizing a user interface to select and located image files onto surfaces, for example. When a digitizing projector system is retained in a single position over time, such as from day to day, a user may load and run a saved projection image file to have a desired projection onto an object. In many cases however, a user may move the digitizing projector system and may then want to project a saved projection image file. As described herein, the projected images, or projection from the projector, will have to be position calibrated for the change in location or orientation of the projector. A user may set one or more targets in the field of view before scanning the object the first time. In many cases, three targets are positioned about or on the object prior to creating the 3D digital file. A user may then create a projection image file and save it. At a later time, a user may set the digitizing projector system up in approximately the same location and place the three targets in the same positions. A scan, and in many case a simplified scan, is initiated and, based on the identified position of the three targets, the digitizing projector, system may auto correct for, or perform an auto-calibration, for the projection of the saved projection image file. In this way, the projected image may be properly projected onto the object even though the digitizing projector system is not is the same location as when the original projection image file was created.

A digitizing projector system is configured to project any suitable type of image, including still and moving images, or videos. Any number of images may be pre-loaded or saved to the memory of the digitizing projector system. A user may simply select any image file from the plurality of images of the digitizing projector system and identify or input which identified surface they want it projected onto. Images may also be loaded onto the digitizing projector system or downloaded from any suitable database. Any suitable way to load images onto the digitizing projector system may be used including a thumb drive, connection with another computing device or through a wireless connection with a computing device or Internet. A user may utilize an image editing feature to further modify an image for projection. A user may change the shape, size, orientation, color, dynamic features and the like. For example, an image editing feature may be used to have a still image configured to move along an identified surface and/or from one identified surface to another. An image editing feature may be used to create a projected image wherein at least one of the images changes in color, size or orientation, such as rotation. An image editing feature may be used to set on-time and off-times for an image to be projected. An image may flash, or be activated to be projected for a certain "on-time" when a motion sensor is activated.

Images may be projected on to any of the surfaces that are identified by the scanner including planar surfaces, geometric surfaces, irregular surfaces, noisy surfaces and edges. An image may be projected to simulate motion across any of these surfaces. In another embodiment, a single color or pattern may be chosen by a user for projection onto a planar or non-planar surface. Image files with colors and patterns may be pre-loaded onto the digitizing projector system, or loaded separately.

In another embodiment, edges may be identified and an image may be projected onto one or more edges. For example, a color of light may be projected onto the perimeter of a house, such as the roof line. In another embodiment, the edges of noisy surfaces may be selected for a projected image. The digitizing projector system may enable a selection of color and width of projected color for projection along an edge. In an exemplary embodiment, a user may select a dynamic edge projection, wherein a dashed line of color is projected to appear to move along the edge. In still another embodiment, a user may select, an edge projection to grow in size or thickness, brightness, blink and the like. These effects may enhance the visual effect of the perimeter of a house, for example.

In still another embodiment, a noisy surface is identified by the digitizing projector system and an image is projected onto a noisy surface. As described herein, a noisy surface may be a tree or bush, for example. A user may select a color to be projected onto the noisy surface. In this way, each tree or shrub within a field of view may be highlighted a different color. A saved image may be projected onto a noisy surface, however, the nature of a noisy surface may not lend itself to clear projection of certain images. A user may find that a simple projection of a color or edge image projection may be better suited for noisy surfaces. For example, a user may select white light to be projected onto a tree with an edge projection of red. A user may also input that they want the edge projection or body portion of the noisy surface to change in sized or width, color, blink or change intensity.

In an exemplary embodiment, a digitizing projector system is configured with a motion sensor that is coupled with the digitizing projector system. The motion sensor may send a wireless signal to the digitizing projector system when it detects a motion, such as from a person walking by, a car moving by, a door opening and the like. An image file for projection may be initiated when the digitizing projector system receives a motion detector input from the motion sensor. An image may be initiated or changed when a motion is detected. In one embodiment, an audio output device, such as a speaker, is coupled with the digitizing projector system and an audio file is played when motion is detected. A special motion detection algorithm may be used to control the function of motion detector initiated effects, including image projection and audio output. Any suitable type of motion detection sensor or device may be used with the digitizing projector system. In an exemplary embodiment, a motion sensor, or detector, is coupled to the digitizing projector system by wires and in another embodiment, a remote motion sensor communicates with the digitizing projector system wirelessly by sending a wireless signal. In still another embodiment, a flash LiDAR is incorporated into the housing of the digitizing projector system and can detect motion in the field of view directly.

A digitizing projector system may be used for military training, security training or other activities wherein a projected image can be used to simulate an environment. For example, a police trainee may walk through an environment configured with one or more digitizing projector systems that project images of criminals that are ready to shoot. Any number of motion sensor and audio output devices may be used to simulate a real world environment. In another embodiment, a haunted house environment, complete with ghost and scary images are configured to pop up as people walk through the haunted house.

In another embodiment, one or more digitizing projector systems are positioned about an object and integrated to project a wider degree about the object than a single projector is capable of, such as about 180 degrees around the object or more, about 270 degrees around the object or more or completely around the object, or 360 degrees around the object. Two, three, four or more digitizing projector systems may be used in an integrated manner to project integrated images around the object or around an enclosure, such as a room. In an embodiment, a plurality of digitizing projectors are configured at least partially within an enclosure and project outward toward interior surfaces of the enclosure, such as a room. In still another embodiment, a digitizing projector system is coupled with one or more additional projectors for the purpose of projecting an integrated image around an enclosure or object.

In still another embodiment, the digitizing projector system comprises an integrated Global Positioning System (GPS) and magnetometer that allows the device to position and orient itself at a geographic location. Software of the digitizing projector system may use GPS input for calibration purposes. GPS coordinates or input may be used to adjust a projected image as a function of an offset from an earlier identified and recorded GPS location. Actual GPS coordinates may be used by the digitizing projector system to simulate accurate sun and moonlight on the physical object for example.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of his specification, illustrate embodiments of the invention, and together with the description serve to explain the principles of the invention.

DETAILED DESCRIPTION OF THE ILLUSTRATED EMBODIMENTS

Figure 1:
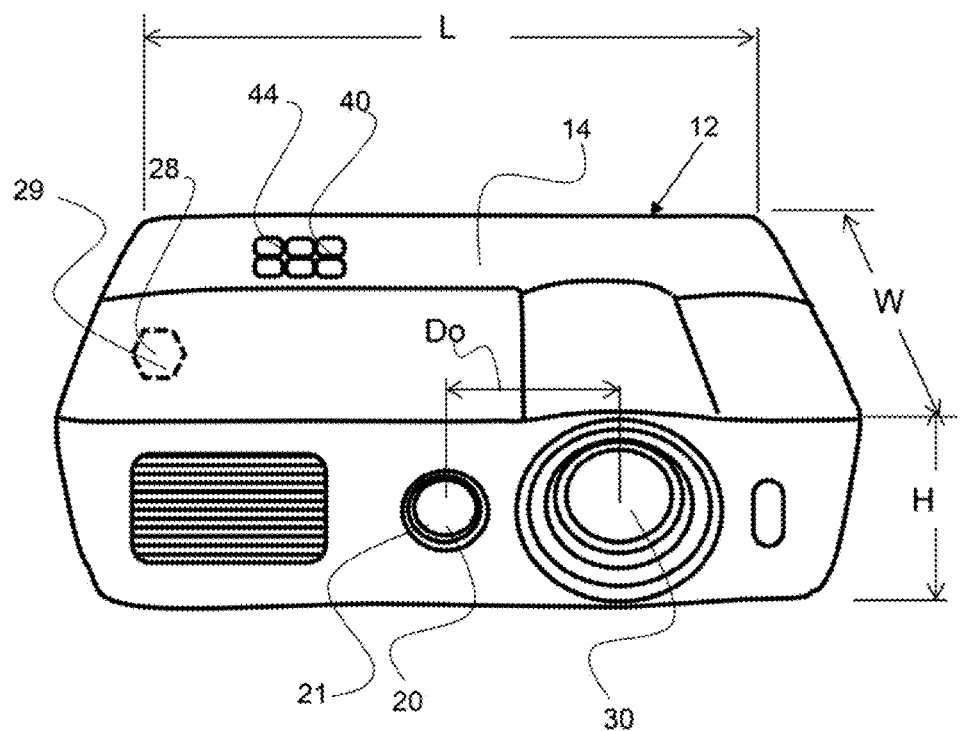

FIG. 1 shows an exemplary digitizing projector system comprising a scanner and a projector enclosed within a single housing.

Figure 2:
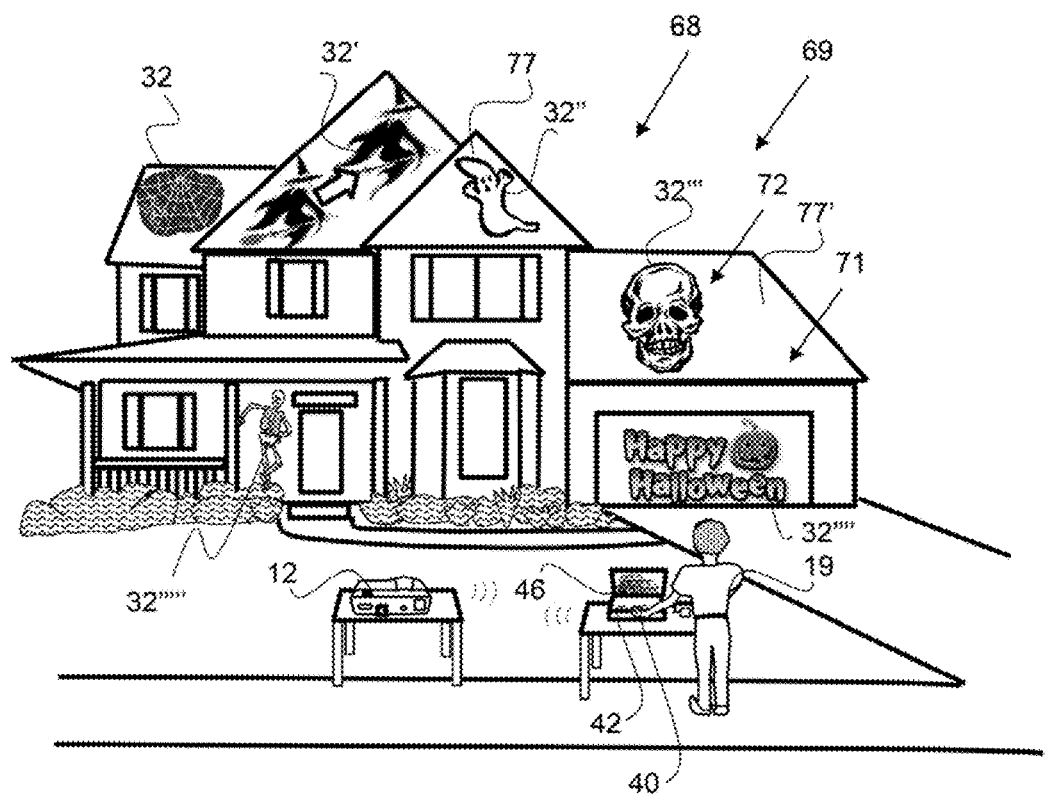

FIG. 2 shows an exemplary digitizing projector system projecting a plurality of exemplary projected images onto planar surfaces of a house.

Figure 3:
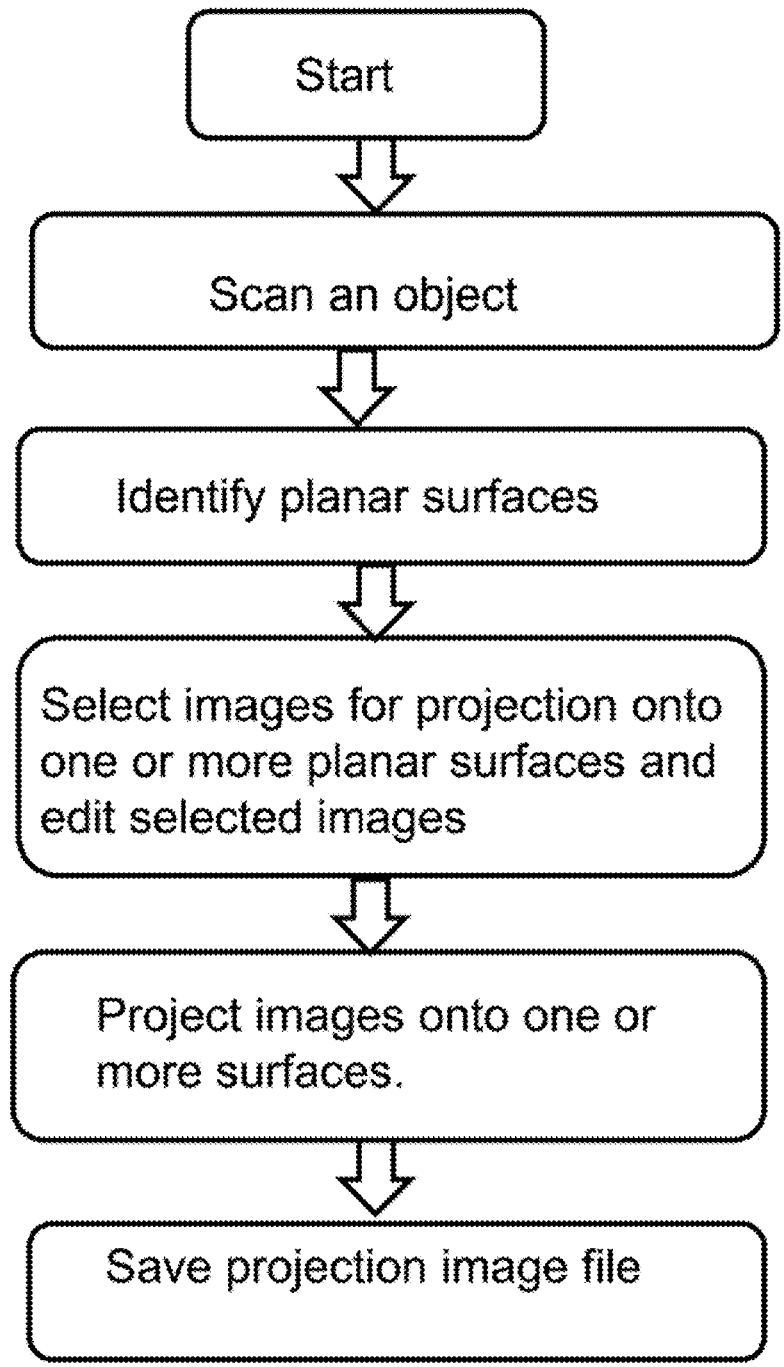

FIG. 3 shows a flow chart of an exemplary method of using an exemplary digitizing projector system to project an image onto one or more surfaces.

Figure 4A:
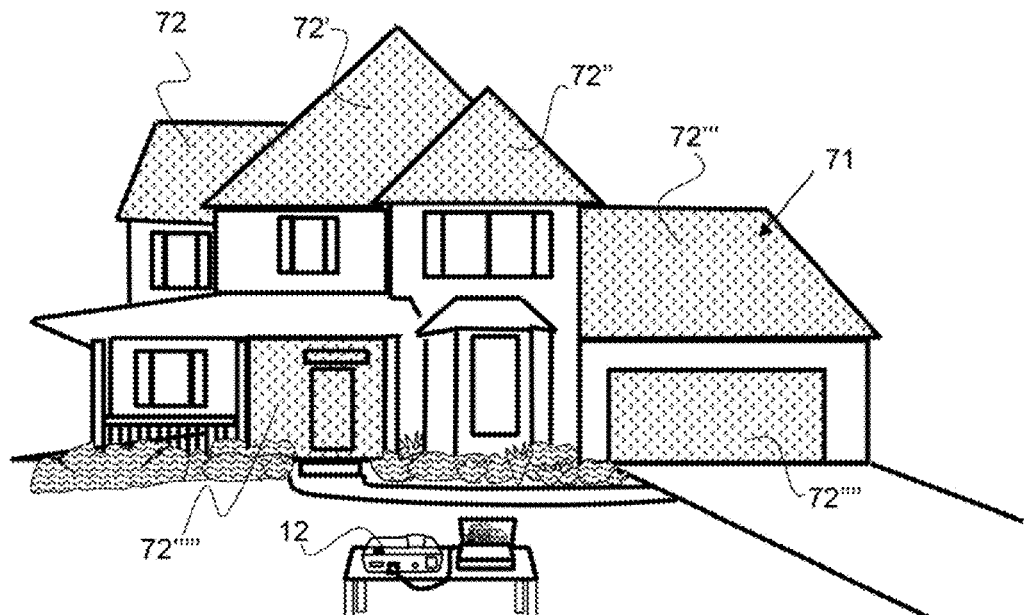

FIG. 4A shows an exemplary digitizing projector system digitizing and identifying surfaces on an object, or house in this example.

Figure 4B:
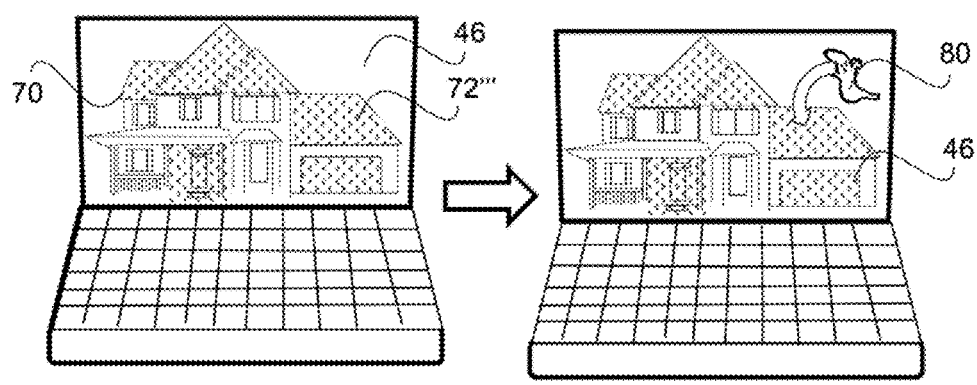

FIG. 4B shows an exemplary display screen showing the digitized image of the house and an exemplary image file of a ghost being located onto one of the identified surfaces of the house.

Figure 5:
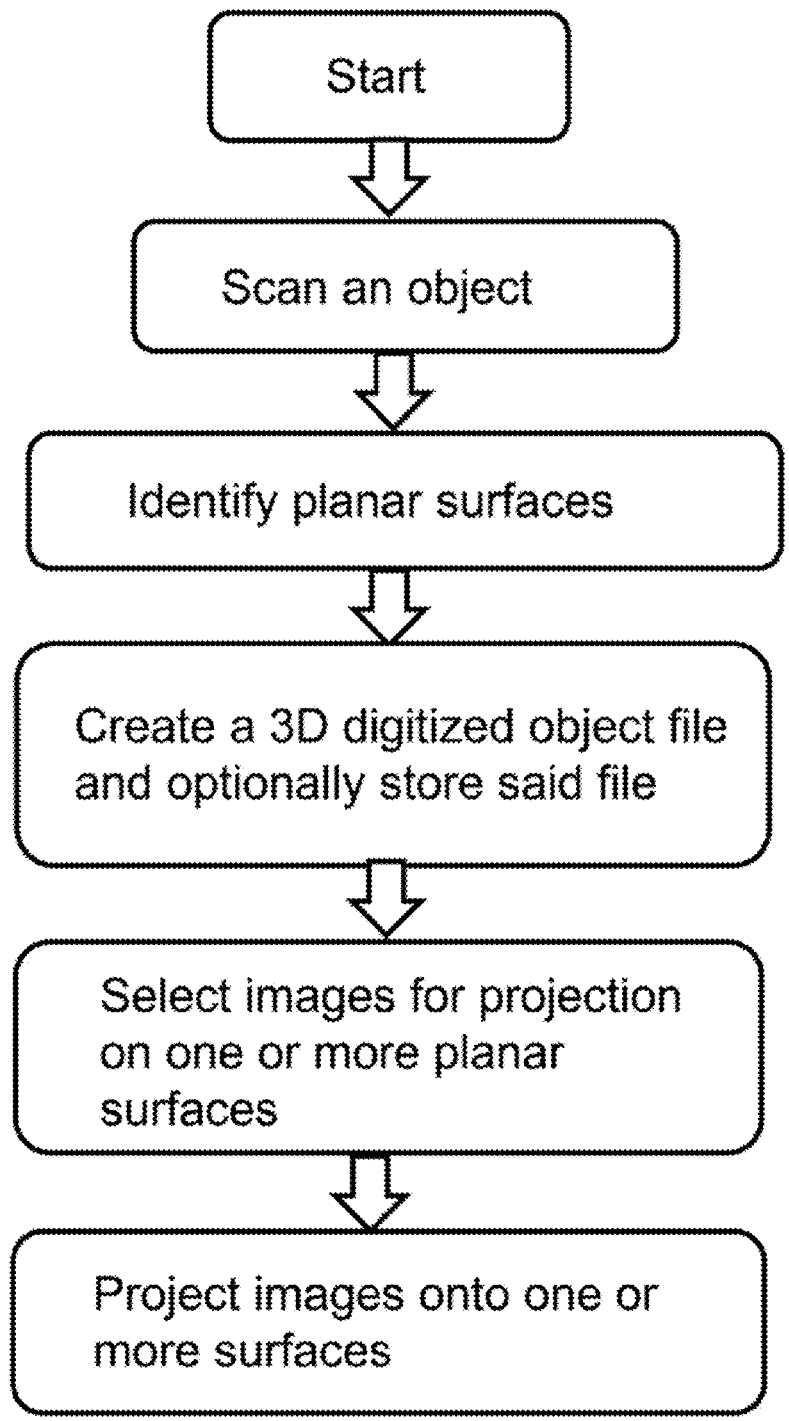

FIG. 5 shows a flow chart of an exemplary method of using an exemplary digitizing projector system to project an image onto one or more surfaces.

Figure 6A:
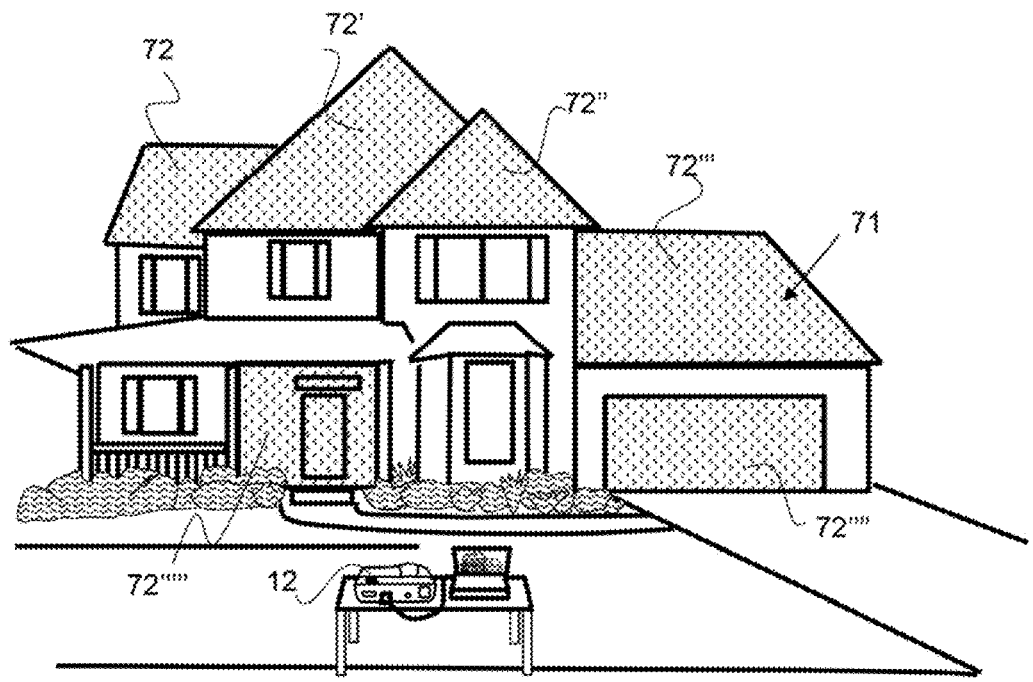

FIG. 6A shows an exemplary digitizing projector system digitizing and identifying planar surfaces on a house.

Figure 6B:
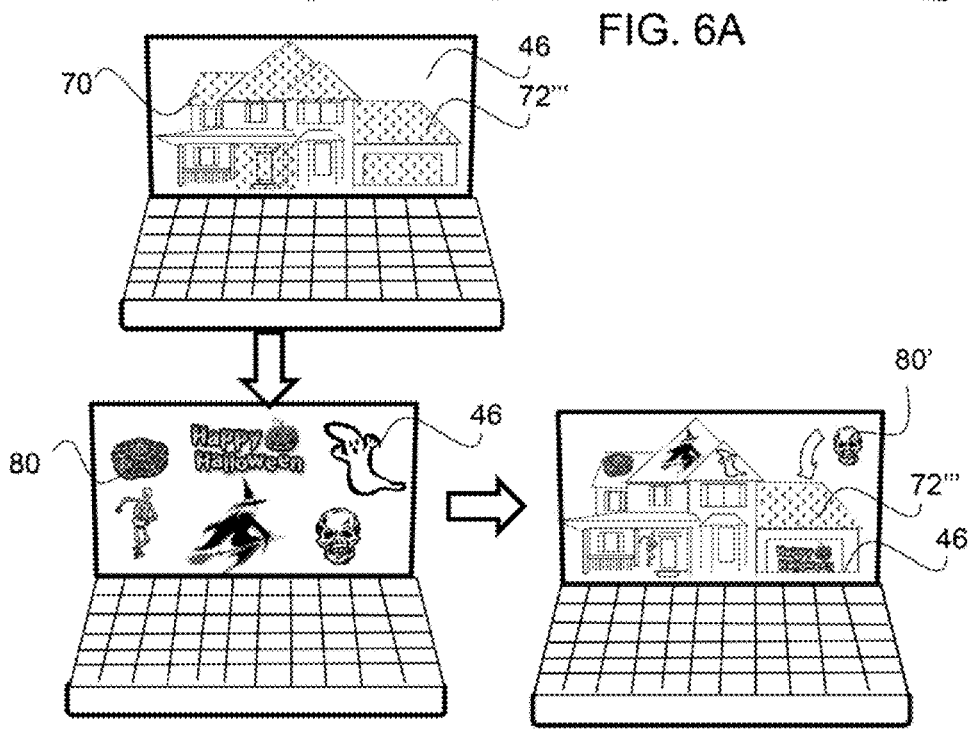

FIG. 6B shows an exemplary display screen showing the digitized image of the house, a plurality of image files and the projector display images being located onto the identified surfaces of the house.

Figure 7:
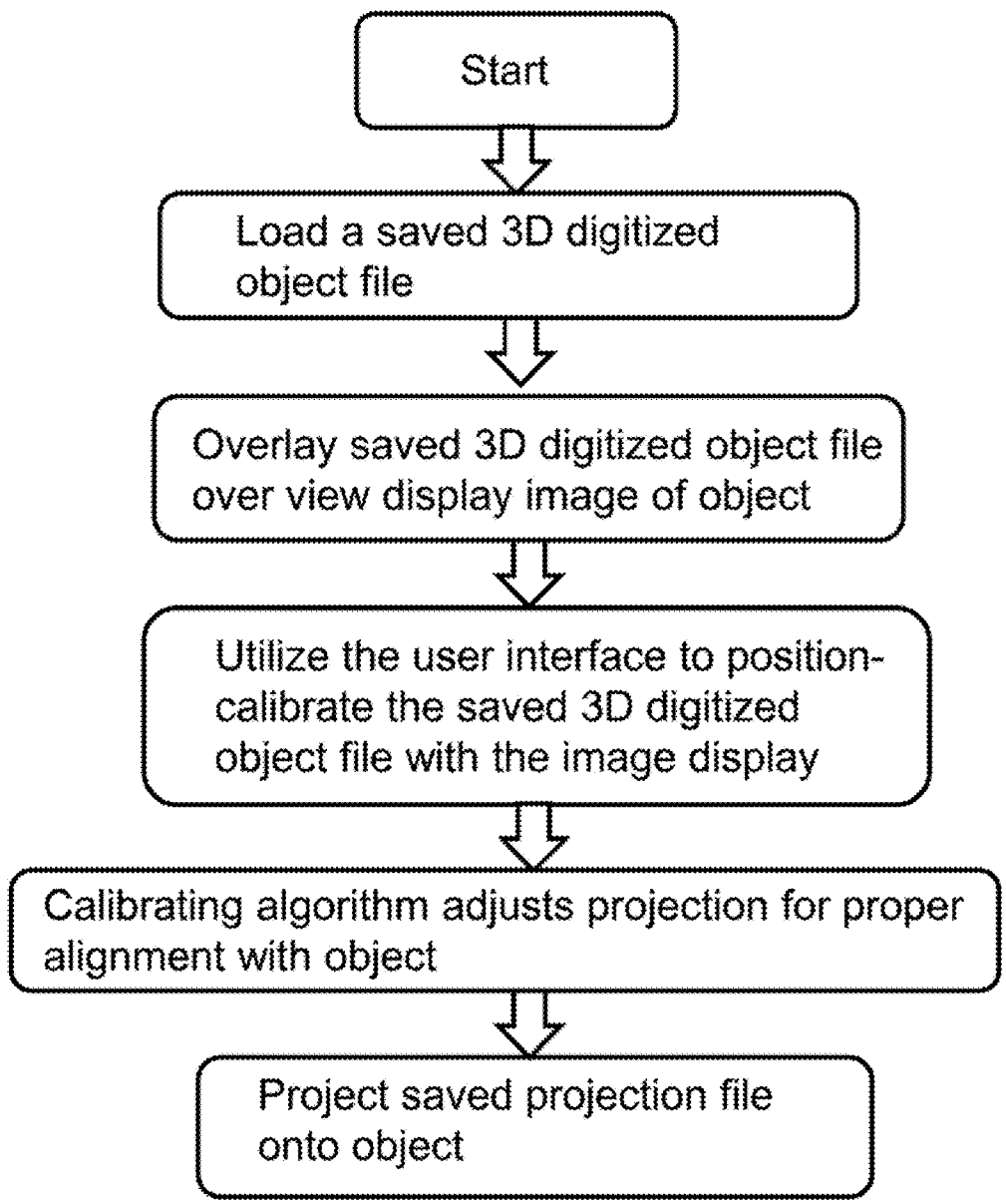

FIG. 7 shows a flow chart of an exemplary method of using an exemplary digitizing projector system to calibrate a new location of the digitizing projector system with an old location of the digitizing projector system.

Figure 8A:
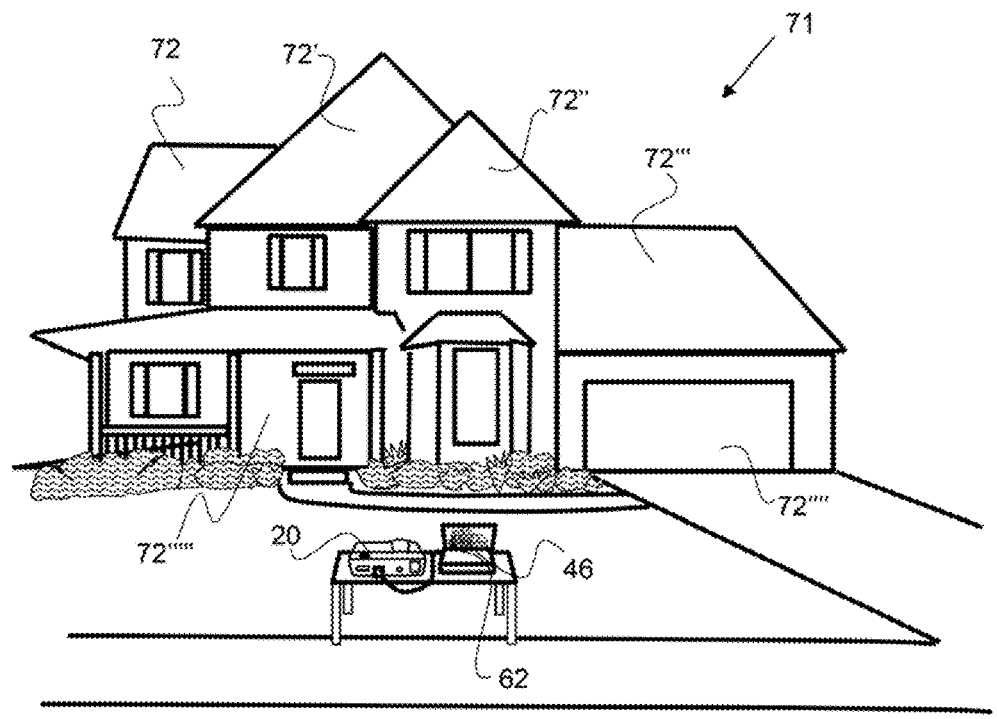

FIG. 8A shows an exemplary digitizing projector system creating a view display image of the hose.

Figure 8B:
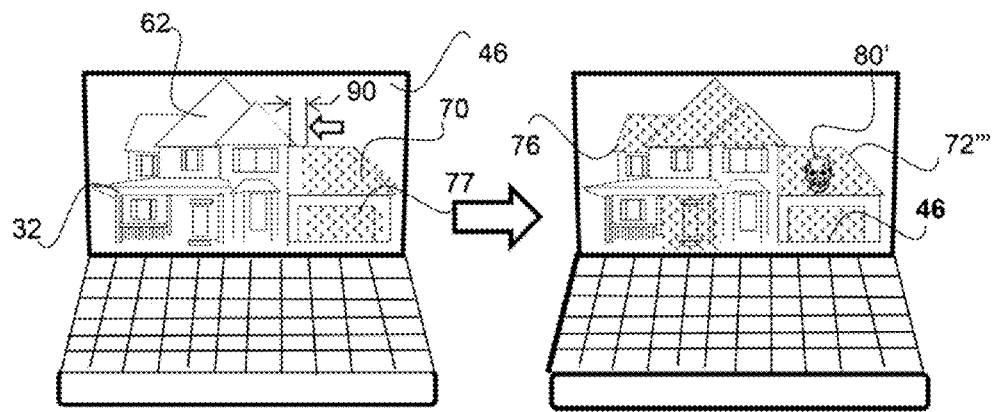

FIG. 8B shows an exemplary display screen showing the view display image of the house, and a saved digitized image overlay thereon with the offset, and a calibrated display.

Figure 9:
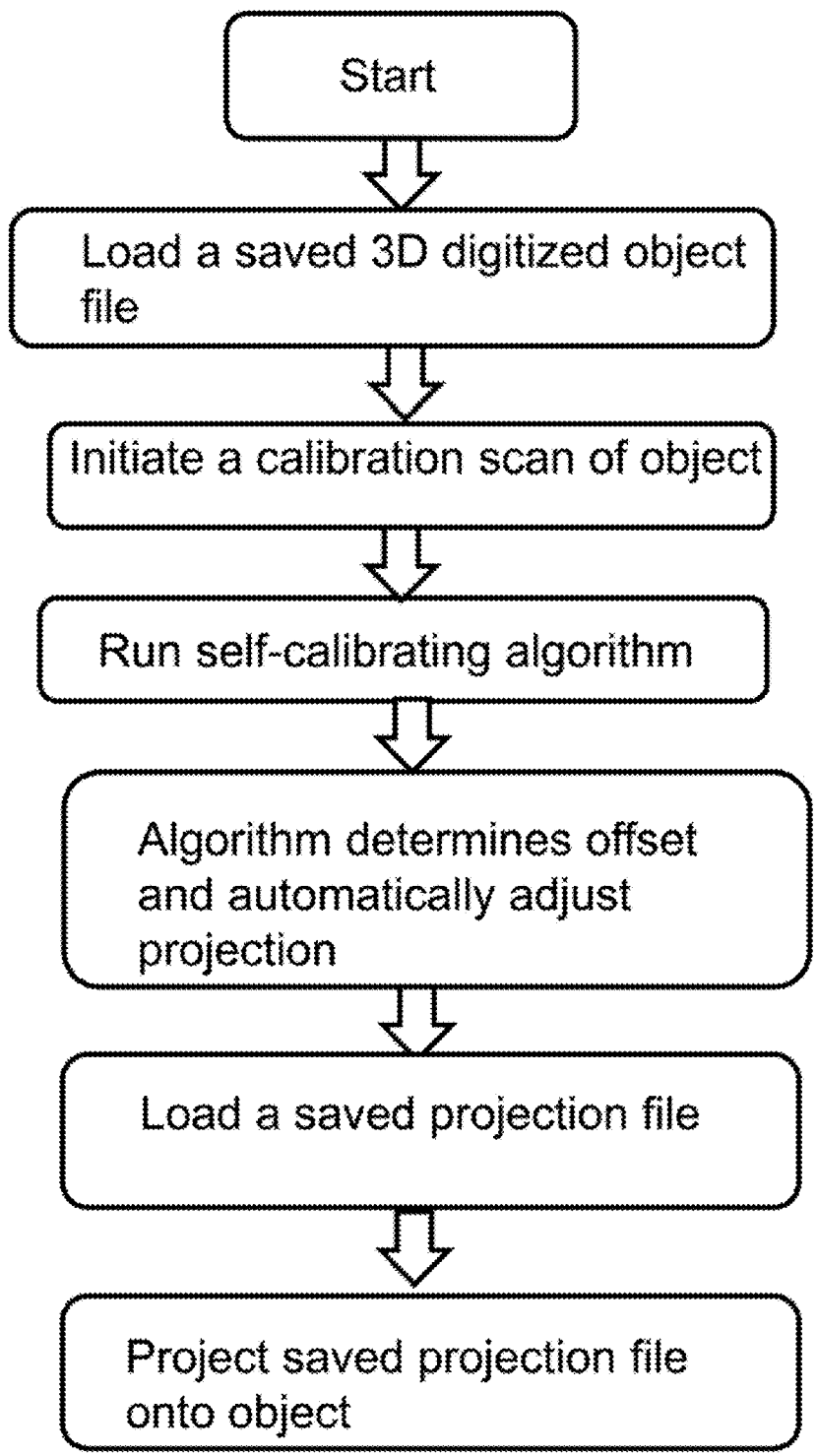

FIG. 9 shows a flow chart of an exemplary method of using an exemplary digitizing projector system to automatically calibrate a new location of the digitizing projector system with an old location of the digitizing projector system.

Figure 10:
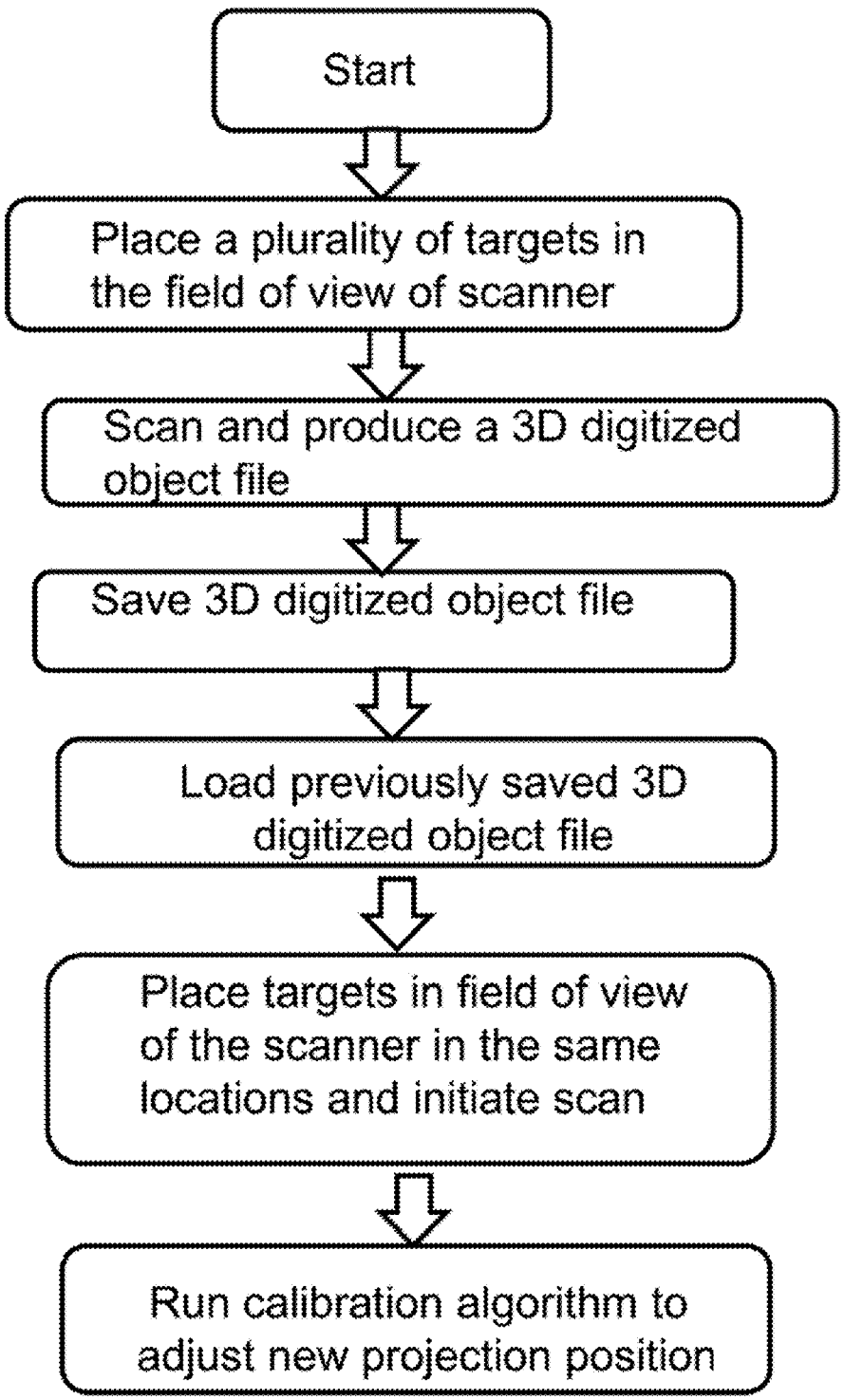

FIG. 10 shows a flow chart of an exemplary method of using an exemplary digitizing projector system and a target to calibrate a new location of the digitizing projector system with an old location of the digitizing projector system.

Figure 11A:
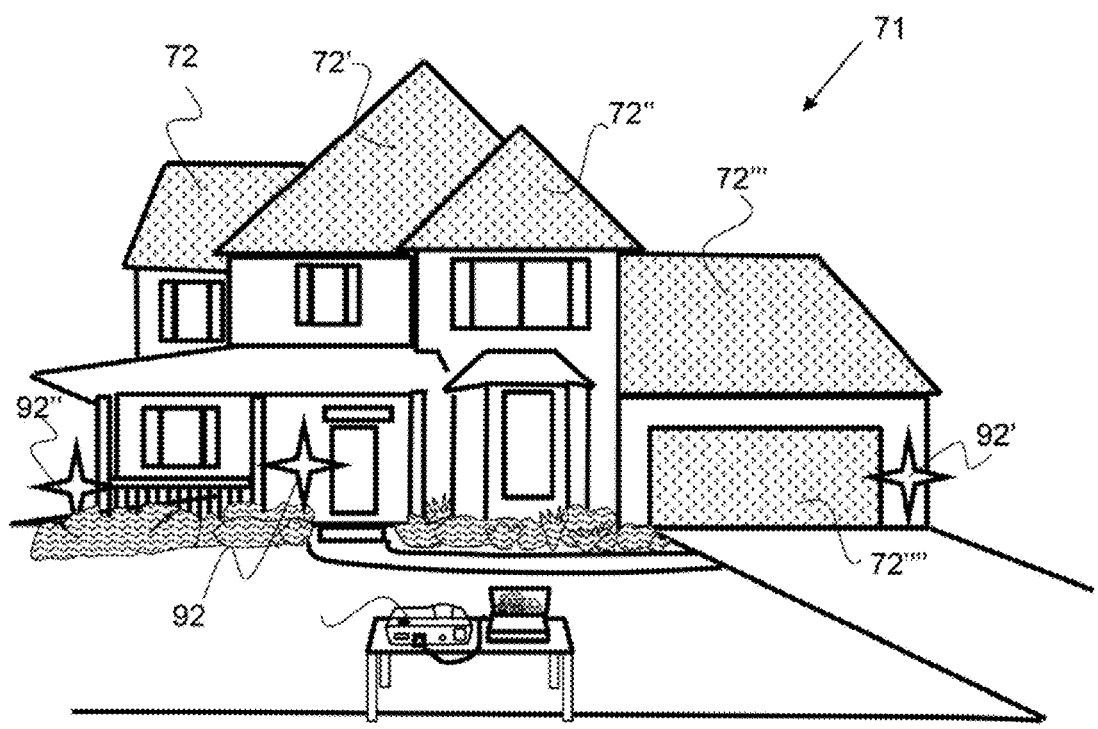

FIG. 11A shows an exemplary digitizing projector system digitizing a house with a target located in the field of view.

Figure 11B:
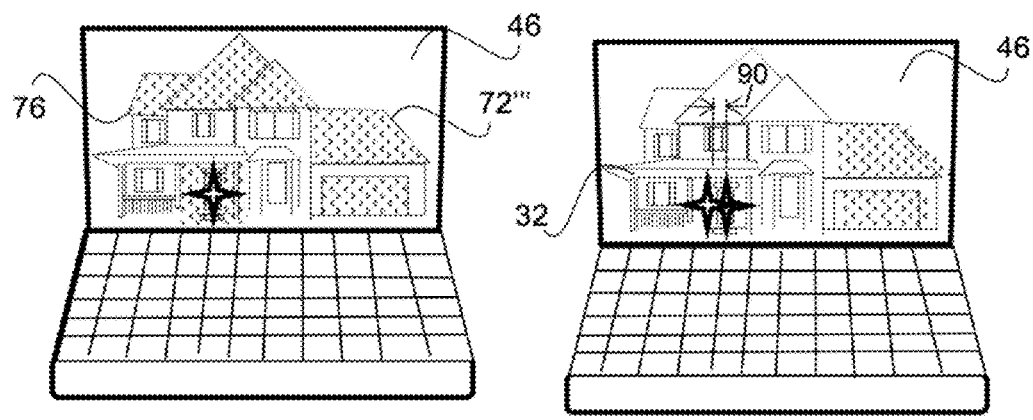

FIG. 11B shows an exemplary display screen showing the current digitized image, and a saved digitized image overlay thereon with the offset of the target.

Figure 12A:
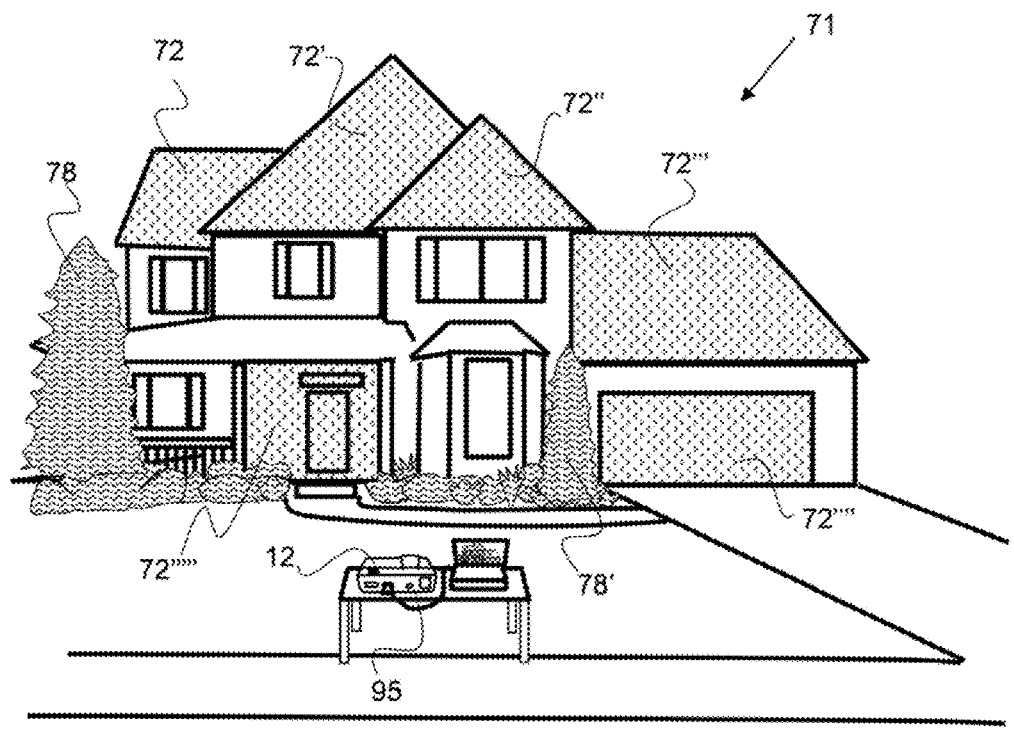

FIG. 12A shows an exemplary digitizing projector system digitizing a field of view having noisy surfaces.

Figure 12B:
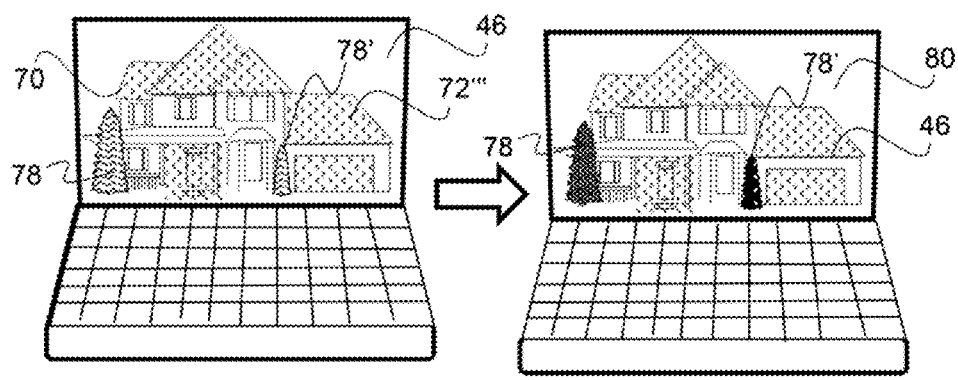

FIG. 12B shows an exemplary display screen showing the digitized image with the noisy surfaces identified and a projected image on the noisy surfaces.

Figure 13:
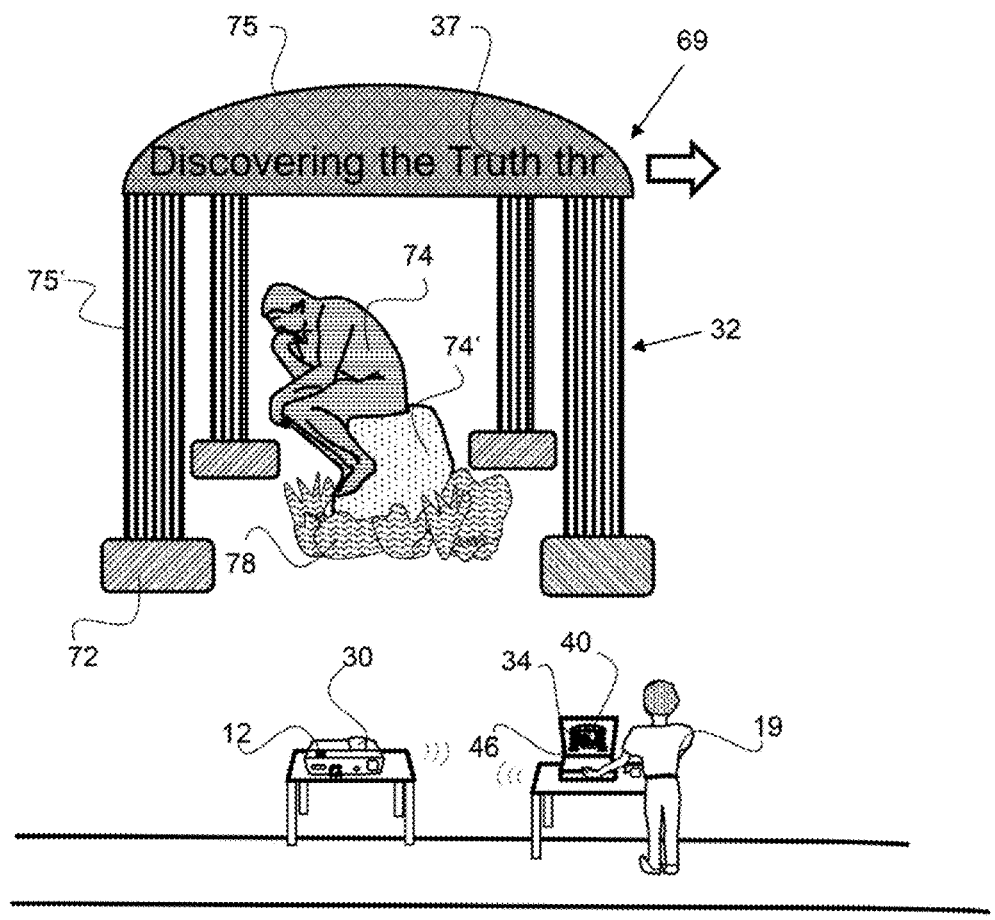

FIG. 13 shows an exemplary digitizing projector system projecting an image file onto identified geometric surfaces, irregular surfaces, planar surfaces and noisy surfaces.

Figure 14A:
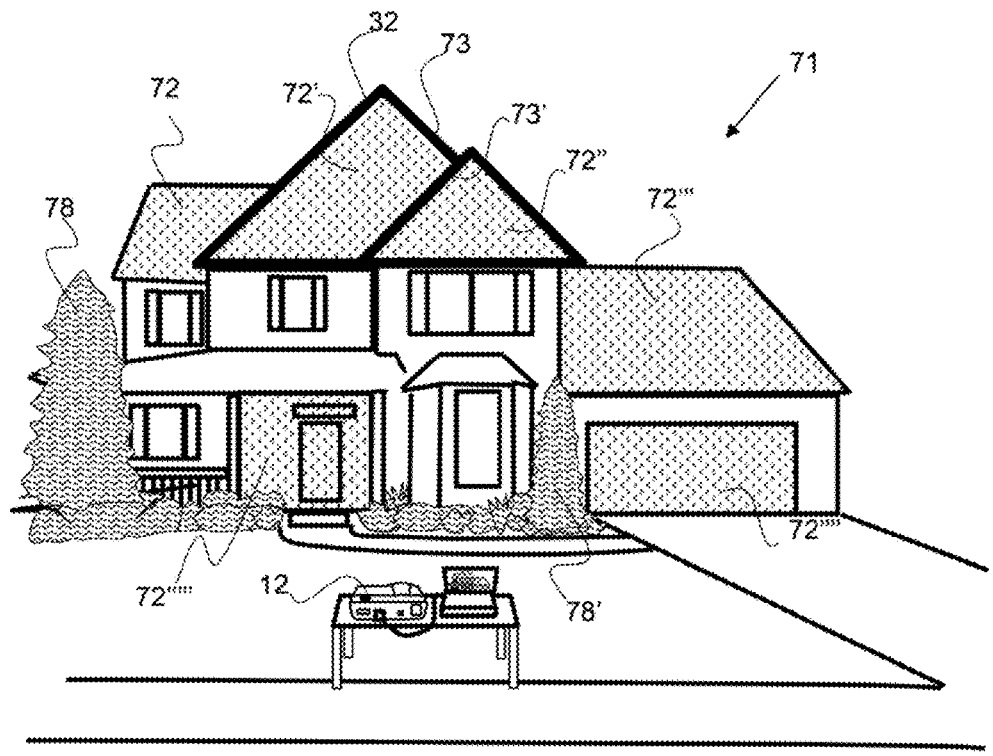

FIG. 14A shows an exemplary digitizing projector system digitizing a field of view having edges.

Figure 14B:
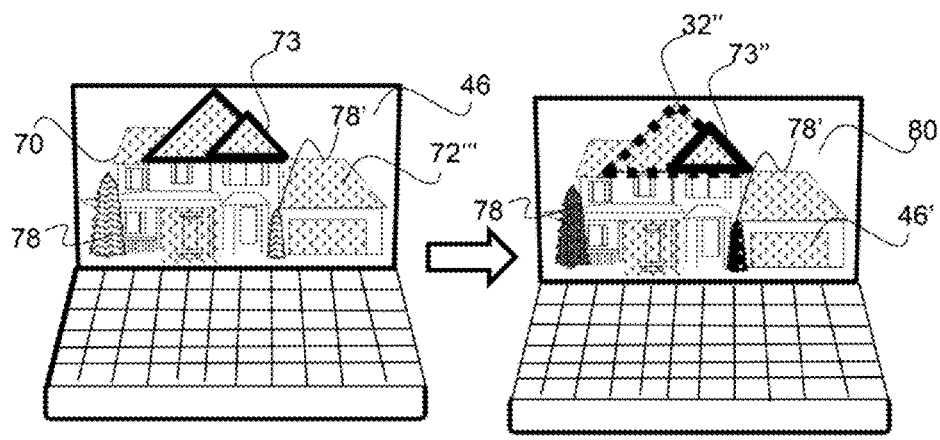

FIG. 14B shows an exemplary display screen showing the digitized image with the edges identified and a projected image on the edge regions.

Figure 15:
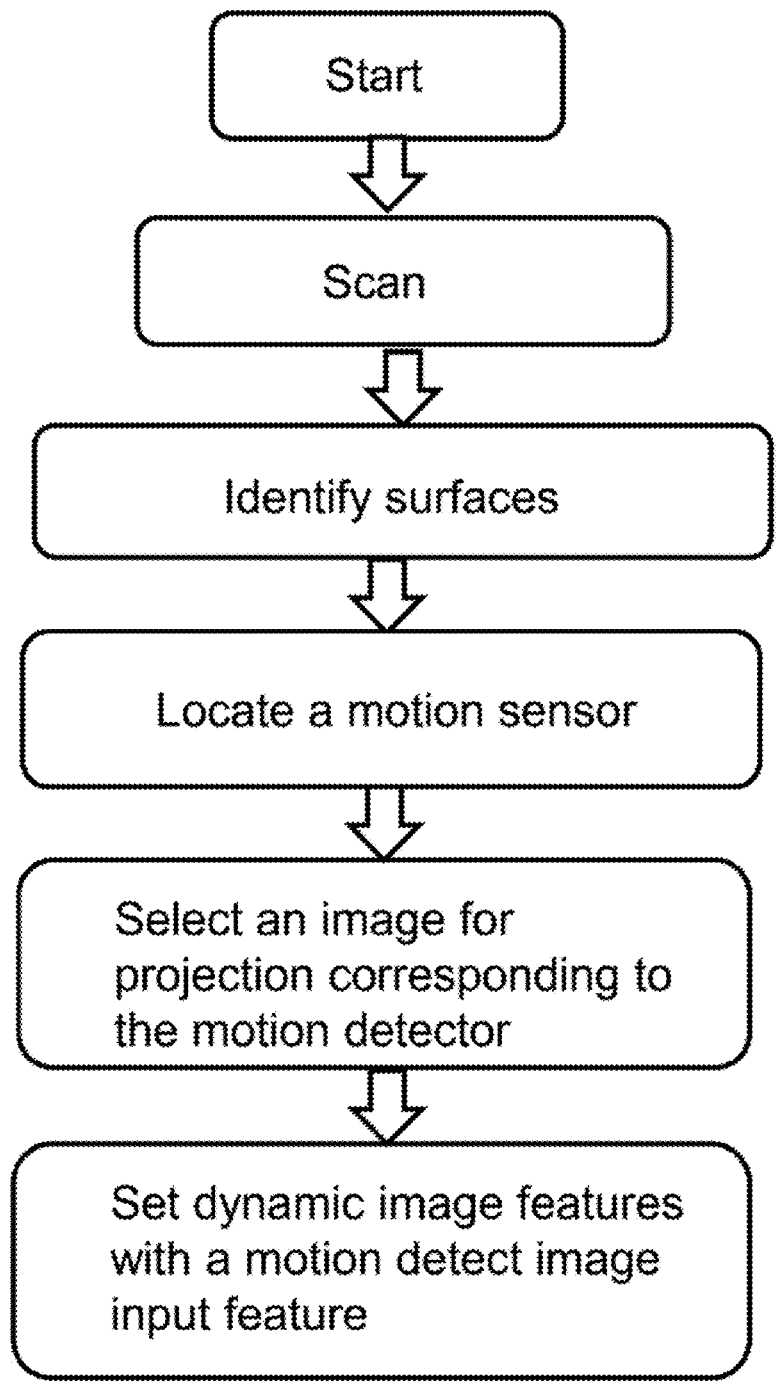

FIG. 15 shows a flow chart of an exemplary method of using an exemplary digitizing projector system to project a dynamic image with a motion sensor input.

Figure 16A:
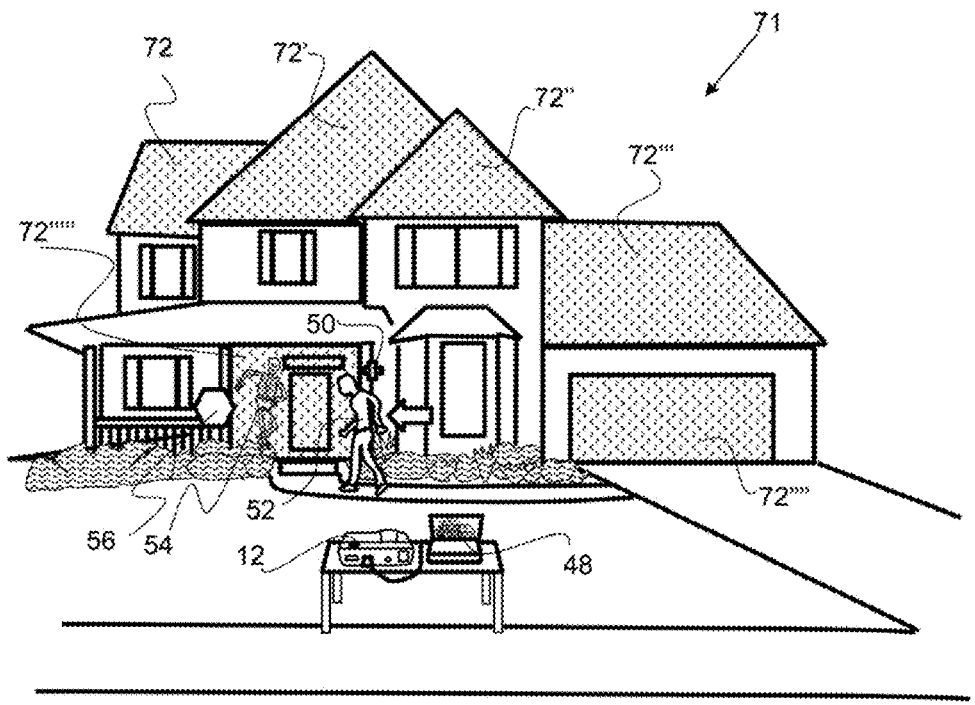

FIG. 16A shows an exemplary digitizing projector system having a motion sensor coupled thereto.

Figure 16B:
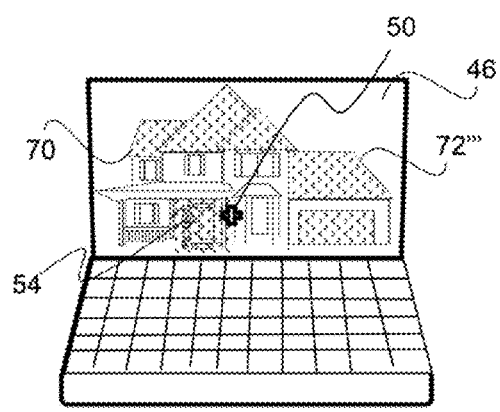

FIG. 16B shows an exemplary display screen showing the digitized image and a dynamic image being located on one of the digitized surfaces.

Figure 17:
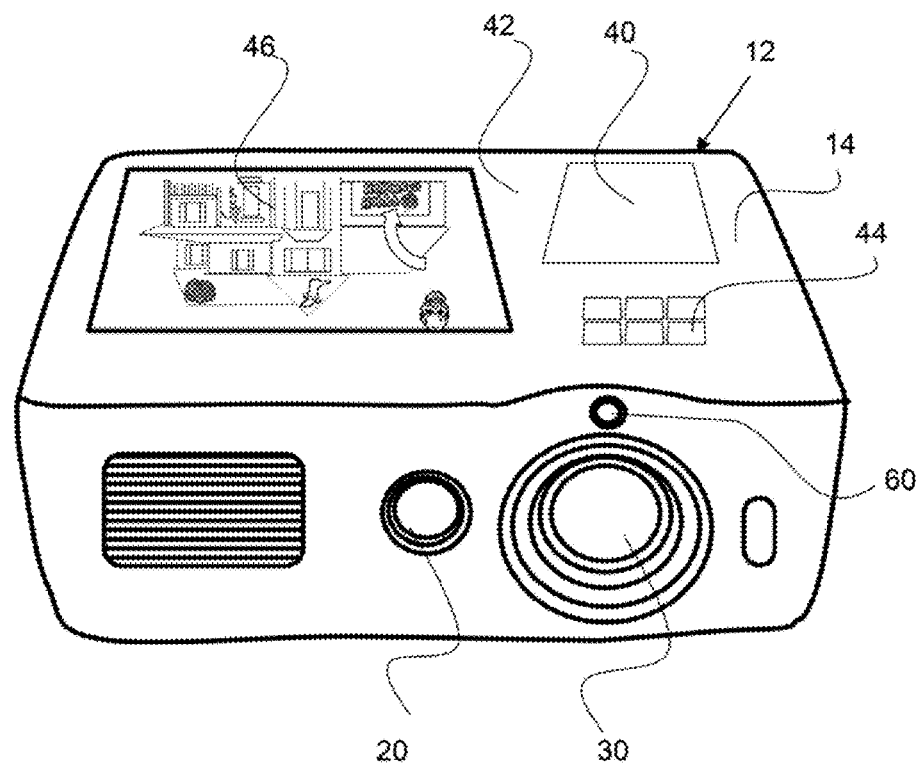

FIG. 17 shows an exemplary digitizing projector system comprising a scanner, projector, display screen and user interface all configured within or to a single housing.

Figure 18:
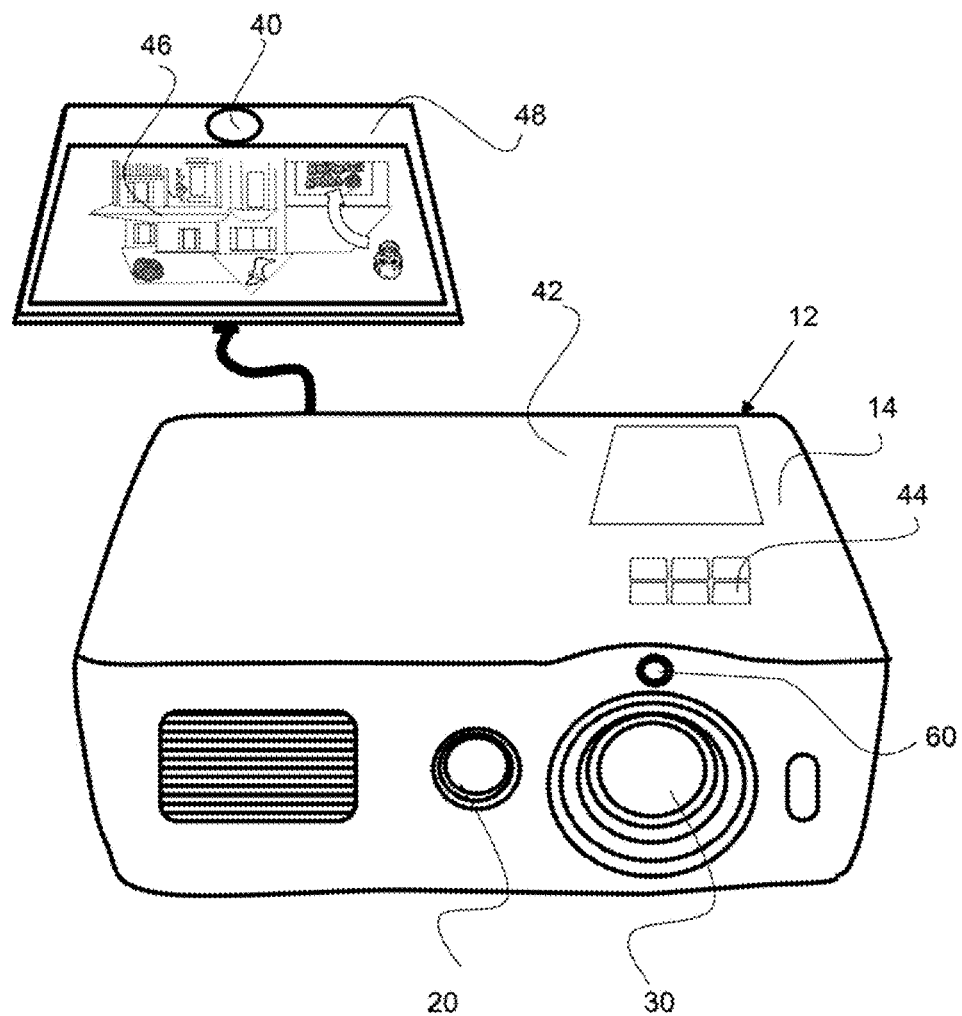

FIG. 18 shows an exemplary digitizing projector system comprising a scanner and projector all configured in a single housing, and a coupled display screen and user interface for locating image files onto surfaces for projection.

Figure 19:
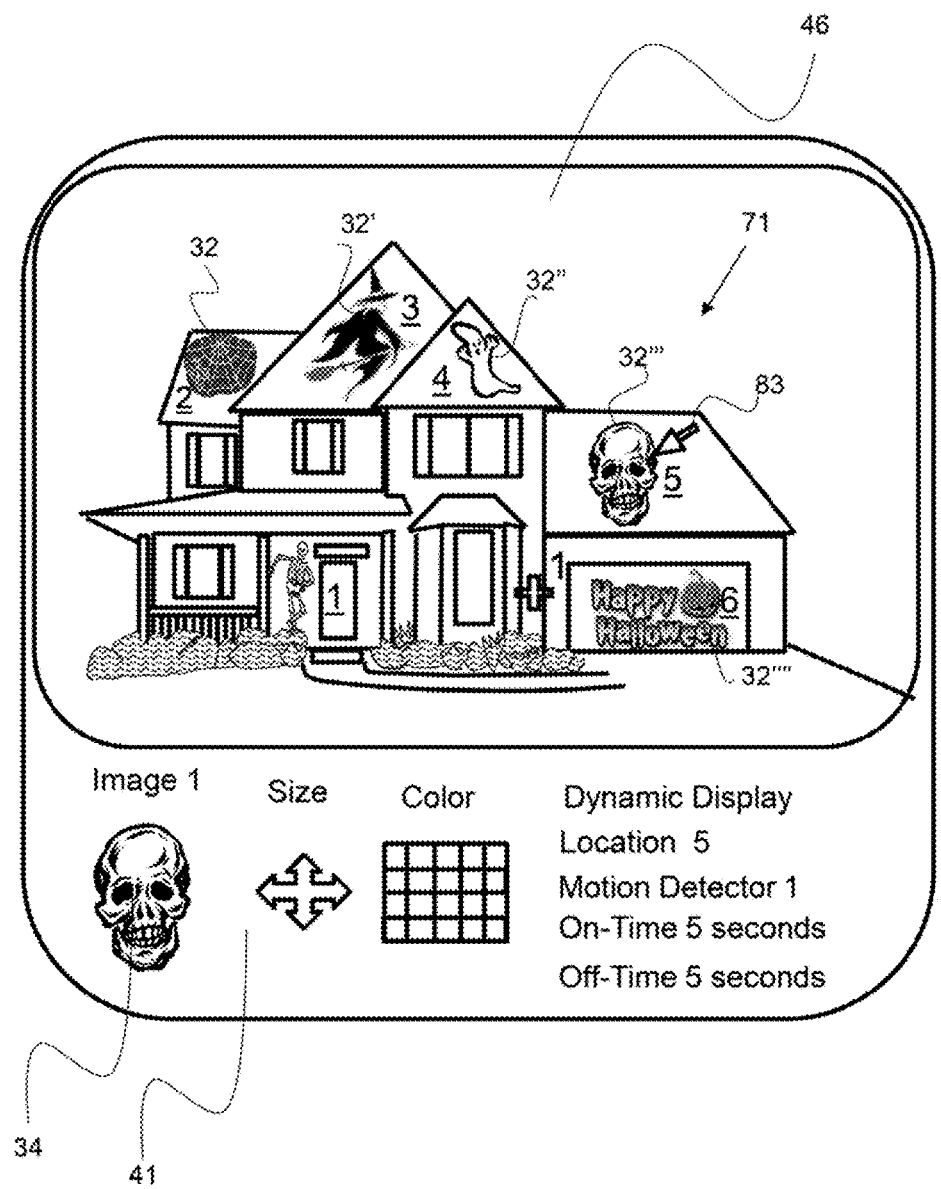

FIG. 19 shows an exemplary display screen having image file editing features including size, color, and dynamic input.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1, an exemplary digitizing projector system 12 comprises a digitizer 20 and a projector 30 enclosed within a single housing 14. The digitizer shown in FIG. 1 is a laser scanner 21. A processor 28 is configured with the exemplary digitizing projector system and may comprise and/or run software 29 or any number of algorithms for controlling the functions of the digitizing projector system. A user interface 40 having an input feature 44 is also coupled with the digitizing projector system in this embodiment. As described herein, a digitizing projector system can auto calibrate for the distance between, or offset of, the digitizer and projector $D_o$. The length, width and height, L, W, H, respectively of the digitizing projector system housing are shown in FIG. 1.

As shown in FIG. 2, an exemplary digitizing projector system 12 is projecting an image, having a plurality of exemplary projected images 32, onto surfaces 77 of a house. The house 71 is the object 69 in the field of view 68 of the digitizing projector system 12. A ghost image 32" is being projected onto a first surface 77 and a skull image 32''' is being projected onto a second surface 77'. In this embodiment, the user is projecting images onto planar, surfaces 72 of the house 71. Also shown in FIG. 2, a user 19 is interfacing with a remote electronic device, or computer 42 that is interfaced with the digitizing projector system 12 through a wireless signal. The remote electronic device has a display screen 46 and a user interface 40 including a key board and mouse. The user interface is isolated from the digitizing projector system to reduce vibrations and ensure there are no changes in position of the digitizing projector system. Two separate supports, tables, are shown for the digitizing projector system and the user interface. The user interface may have a cable that couples the interface to the digitizing projector system or it may interface wirelessly. A user may use the remote or auxiliary user interface, or computer, to create a projection image file that may be saved by the digitizing projector system.

FIG. 3 shows a flow chart of an exemplary method of using an exemplary digitizing projector system to project an image onto one or more surfaces. In this exemplary method, a scan of an object is performed to identify surfaces, such as planar surfaces. A user interface is used to select images for projection onto one or more of the identified surfaces. The selected images are then projected onto the one or more surfaces. As described herein, the images may be moving or still images and a user may modify the images in shape, size, color, orientation, motion and dynamic features including on-time and off-time, for example. In addition, a speed of motion of a moving image may be edited by a user. A user may save the projection image file for future projection or for editing at a later time. A projection image file may comprise both the 3D digitized object file of the object and the images for projection thereon.

As shown in 4A, an exemplary digitizing projector system 12 is digitizing and identifying planar surfaces 72-72'''' of a house 71. The planar surfaces are shown as cross-hashed areas.

As shown in FIG. 4B, an exemplary display screen is displaying the digitized image 70 of the house. An exemplary image file 80 of a ghost is being located onto one of the identified surfaces 72''' of the house. The ghost image file may be modified or edited, such as by changing the size to more fully cover the planar surface 72'''.

FIG. 5 shows a flow chart of an exemplary method of using an exemplary digitizing projector system to project an image onto one or more surfaces. In this method, a 3D digitized object file is created and optionally stored for later use. The saved 3D digitized object file may be used at a later time for position calibration of the digitizing projector system and calibration of projection of one or more image files. As described herein, the saved 3D digitized object file and digitized image produced therefrom may be used for calibrating a new location of the digitizing projector system.

As shown in FIG. 6A, an exemplary digitizing projector system 12 is digitizing and identifying planar surfaces 72 on a house 71.

As shown in FIG. 6B, an exemplary display screen 46 is displaying the digitized image 70 of the house and a plurality of image files 80. A user may select an image file and then locate it onto the digitized image for display onto an identified surface. Any suitable manner of identifying an image file for display onto an identified surface may be used. In an exemplary embodiment, an image file may be dragged or moved on a displayed image of the object for location, as indicated by the large arrow next to the image file 80' of the skull.

FIG. 7 shows a flow chart of an exemplary method of using, an exemplary digitizing projector system to calibrate a new location of the digitizing projector system with an old location of the digitizing projector system. In this method, a user calibrates a new location of the digitizing projector system with a saved digitized image by moving the saved digitized image to overlay the actual view image. In this embodiment, an actual view image of the object may be displayed on a display screen and a saved digitized image or a portion of a saved digitized image, such as one or more identified surfaces, may also be shown on the display screen. A user may select and drag either the actual view display or preferably the digitized image or portion thereof, to overlay correctly. For example, a planar surface of a saved digitized image may be displayed as an overlay on a view display and a user may select and drag, resize or rotate the planar surface to correctly overlay or match with the view display. A new location of a digitizing projector system may be offset in position such that a previously digitized image, or portion thereof, has to be moved to the left, right, up or down, enlarged or reduced in size or rotated to match with the new location of the digitizing projector system. The digitized image may overlay a view display of a new digitized image produced from a scan of the object from the new location.

As shown in FIG. 8A, an exemplary digitizing projector system 12 is creating a view display image 62 of the house 71. The view display image may be a camera view or a digital camera view.

As shown in FIG. 8B, the view display image 62 is being shown on a display 46 along with a previously digitized and saved image 70. The processor displayed the digitized image 70 from a saved 3D digitized object file 76. An offset 90 between the view display image and the saved digitized image 70 indicates that the position of the digitizing projector system is not the same as when the saved 3D digitized object file was produced. A user has selected the saved digitized image using a user interface, feature and has moved it to substantially overlay with the view display image, as indicated by the digitized image overlaying the view display properly on the display screen 46'. An algorithm may utilize the users editing inputs of the saved digitized image to modify the projector to correctly display on the previously identified surfaces. The algorithm may take into account any editing of the digitized image or portion thereof, including movement, resizing, and rotation to effectively modify a projected image onto the one or more surfaces identified.

FIG. 9 shows a flow chart of an exemplary method of using an exemplary digitizing projector system to automatically calibrate a new location of the digitizing projector system with an old location of the digitizing projector system. In this method a user loads a saved 3D digitized object file and then runs a calibration scan of the object. The calibration scan of the object may be a less intensive scan or may only scan one or more surfaces. An algorithm may then automatically compare the calibration scan results with the saved 3D digitized object file and alter the projected images to correspond with the new location of the projector system. A previously saved projection file may be loaded and projected in a location calibrated manner to correctly display with respect to the new location of the digitizing projection system. For example, a user may place the digitizing projection system in front of their house and do a full scan of the house to identify surfaces. The user may then select image files for projection onto a plurality of surfaces, as shown in FIG. 2 for example. They may invest a considerable amount of time and effort into selecting images, sizing positioning and editing the images to create a projection image file. The following Halloween, the user may set up the digitizing projector system in approximately the same location as the previous year and run an auto-calibration method as described in FIG. 9 to begin projecting their saved projection image file from the previous year.

FIG. 10 shows a flow chart of an exemplary method of using an exemplary digitizing projector system and a plurality of targets to calibrate projection for a new location of the digitizing projector system with an old location of the digitizing projector system.

As shown in FIG. 11A, an exemplary digitizing projector system is digitizing a house with a target located in the field of view.

As shown in FIG. 11B, an exemplary display screen is showing the current digitized image, and a saved digitized image overlay thereon with the offset of the targets.

As shown in FIG. 12A, an exemplary digitizing projector system 12 is digitizing a field of view having noisy surfaces 78, or trees and shrubs in this example. A noisy surface is a surface that has high depth of field noise from a scan. A tree or bush, for example, does not have a well-defined planar surface as the leaves will reflect back in all directions and there are portions of the bush or tree that have different depths, or distances from the scanner.

As shown in FIG. 12B, an exemplary display screen 46 is showing the digitized image 70 with the noisy surfaces 78 identified and a projected image on the noisy surfaces. A user may want their trees to be different colors, flash different colors and the like. In the display image on the display screen 46, the first noisy surface 78 is a first color and the second noisy surface 78' is a second color. Also shown in FIG. 12A is a Global Positioning System (GPS) 95 that can be used by the digitizing projector system 12 for calibration for an offset or for modification of projected images for sun light direction, for example.

As shown in FIG. 13, an exemplary digitizing projector system 12 has created a 3D digitized object file that includes identified planar surfaces 72: the blocks at the bottom of the pillars, geometric surfaces, the dome 75 and cylindrical pillars 75'; irregular surfaces; the statue 74 and rock 74'; and noisy surfaces 78; the bushes at the base of the statue. The projector 30 is projecting a projected image 32 of an image file 34 onto the various surfaces, as indicated by the different fill patterns. The projected image may be different colors and patterns or images of any sort including text 37 and moving images. An image file may contain dynamic projected images, wherein the projected image changes as a function of time. For example, the dome may flash different colors or have text 37 or phrase that scrolls around the object. The user 19 is using a user interface 40, a computer, to edit and modify the projected image file and projected image. The auxiliary user interface communicates with the digitizing projector system 12 wirelessly.

As shown in FIG. 14A, an exemplary digitizing projector system 12 is digitizing a field of view having edges 73. The edges identified are the borders of the house, or a border of planar surfaces of a house. An edge may be the intersection of planar surfaces, the outside edge of a planar surface or noisy surface, for example.

As shown in FIG. 14B, an exemplary display screen 46 is showing the digitized image 70 with the edges 73 identified. The display image 46' shows a projected image 32" on the edges 73". One of the projected images is a still image and the other is a dynamic image, wherein the projected edge image blinks as indicated by the dashed line. A projected edge image may be a moving image as well and give the illusion of movement along the edge, such as a dashed line that indexes along the edge to simulate motion.

FIG. 15 shows a flow chart of an exemplary method of using an exemplary digitizing projector system to project a dynamic image that is coupled with a motion sensor input. A user may locate one or more motion sensors and an input from a motion sensor may be coupled with the initiation or activation of a projected image. The projected image may be a still image that starts to move or change in some way, or a projected image may be initiated. The projected image may be a or moving image.

As shown in FIG. 16A, an exemplary digitizing projector system 12 has a motion sensor 50 configured next to the house and particularly near the front door of the house. A person or motion activator 52 is walking up the sidewalk to the house. As the person approaches the motion sensor, it senses the motion and sends a signal to the digitizing projector system. The processor and/or motion detection algorithm may then initiate the projection of an activated image 54 onto an identified surface. In this example, a skeleton appears next to the front door to scare the person. The skeleton may be a dynamic image. An audio output device 56, such as a speaker, may also be coupled with the digitizing projector system and may be activated to play an audio file that is synchronized with the activated image 54. The skeleton may sing a happy Halloween song, for example, or say Boo.

As shown in FIG. 16B, an exemplary display screen 46 is showing the digitized image 70 and a activated image 54 located on one of the digitized surfaces. Any suitable user interface may be used to correlate an image file with a motion sensor to make it an activated image. An activated image input feature may allow time delays and audio file linking with a activated image.

As shown in FIG. 17, an exemplary digitizing projector system 12 comprises a digitizer 20, projector 30, display screen 46 and user interface 40 all configured within or to a single housing 14 or enclosure. It may be preferred to keep the user interface separate from the housing to ensure that the digitizing projector system, or at least the projector portion, is not moved after being located in a desired place. The length, width and height of the housing may be less than about 15 cm, less than about 10 cm, less than about 8 cm, less than about 5 cm and any range between and including the housing dimensions provided.

As shown in FIG. 18, an exemplary digitizing projector system 12 comprises a digitizer 20 and projector 30 all configured in a single housing 14. In this embodiment, a display screen 46 and user interface 40 are coupled to the housing 14. In this way, manipulation of the user interface may not cause vibrations or movement of the projector.

As shown in FIG. 19, an exemplary display screen 46 has image file editing features including size, color, and dynamic input or movement of a projected image. A number of identified surfaces, 1-6, are shown in the display image on the display screen 46. The image file 34 corresponds to skull projected image 32'" located on the roof of the garage. A user may review the projected image and decide if they want the projected image larger or smaller and use the size input feature for changing the size of the projected image. A user may want to change the color of a projected image and use the color input feature to change the color of the projected image. A user may want the projected image to have a dynamic display characteristic, wherein the image is not a static image. The user may set an on-time and an off-time, for example. A user may also input motion of an image, wherein the image moves across an identified surface of from a first identified surface to a second identified surface. A user may also input a combination dynamic projected image feature, wherein the image changes in shape, color, orientation or location over time. A user may want an image to grow in size and change from yellow to red, for example. In another example, a user may want an image to appear in a first identified surface and then disappear and appear in a second identified surface. The projected image may change in color or size as it moves from identified surface to surface. In another embodiment, a user may want a projected image to move across a single identified surface as shown in FIG. 2, wherein the witch is moving along a portion of the roof. Also shown in FIG. 19 is a drawing feature 83, a type of user input feature, that allows a user to draw an image or modify an existing image file or projected image by drawing. A drawing feature may comprise any suitable type of drawing features including line inputs, text input, shape inputs, color inputs, fill inputs, and the like.

DEFINITIONS

A digitizer, as used herein, is a device that produces a 3D digitized object file representing a 3D object and may comprise a scanner, processor and software to produce a digital file of the scanner input.

A change in position of a digitizing projector system, as described herein, includes a change in position and orientation such as roll, pitch or yaw.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A digitizing projector system comprising:
   a. a housing;
   b. a digitizer;
   c. a processor;
   wherein the digitizer is coupled with said processor and said processor is configured to produce a 3D digitized object file of an object and identify one or more surfaces of said 3D digitized object file;
   d. a projector configured to project an image file onto said one or more surfaces to produce a projected image;
   e. a user interface configured to position one or more projected images onto the one or more surfaces
   wherein the digitizer projector and processor are all configured within said housing.

2. The digitizing projector system of claim 1, wherein the digitizing projector system is self-calibrating and comprises:

a position calibrating algorithm that self-calibrates the projected image as a function of an offset between the 3D digitized object file with a saved 3D digitized object file, wherein the offset results from an offset position of the digitizing projector system from a previous position of the digitizing projector system used to create the saved 3D digitized object file;

whereby the offset is adjusted for by said position calibrating algorithm such that the projected image overlays correctly on the one or more surfaces.

3. The digitizing projector system of claim 2, comprising one or more calibrating targets, wherein said position calibrating algorithm detects a location of said calibration targets in the saved 3D digitized object file and compares said location with a new location in the 3D digitized object file.

4. The digitizing projector system of claim 2,
wherein said position calibrating algorithm is an automatic self-calibrating algorithm configured to automatically self-calibrate the projected image as a function of the offset position of the digitizing projector system;

wherein said automatic self-calibrating algorithm compares one or more surfaces of the 3D digitized object file with one or more surfaces of the saved 3D digitized object file to determine an offset; and wherein the projected image is modified to correctly overlay on the one or more surfaces.

5. The self-calibrating digitizing projector system of claim 1, comprising a display screen.

6. The self-calibrating digitizing projector system of claim 5, wherein the display screen is configured to display a digitized image.

7. The digitizing projector system of claim 5, wherein the digitizing projector system produces a display image on the display screen that comprises:
a. a view display of an object; and
b. a digitized image overlay.

8. The digitizing projector system of claim 7 comprising a user interface to adjust the digitized image overlay to correspond with the view display.

9. The digitizing projector system of claim 5, comprising a drawing input feature that enables a user to produce a drawing projected image; and
whereby the projector is configured to project said drawing projected image onto the one or more surfaces.

10. The digitizing projector system of claim 1, wherein at least one of the one or more projected images is a moving image.

11. The digitizing projector system of claim 1, wherein at least one of the one or more projected images is a stored image that is stored in a memory.

12. The digitizing projector system of claim 1, wherein the single housing has no dimension greater than about 24 inches.

13. The digitizing projector system of claim 1, wherein at least one of the one or more surfaces is a planar surface and whereby the projector projects the projected image onto said planar surface.

14. The digitizing projector system of claim 1, wherein at least one of the one or more surfaces, is a geometric surface and whereby the projector projects the projected image onto said geometric surface.

15. The digitizing projector system of claim 1, wherein at least one of the one or more surfaces is an irregular surface and whereby the projector projects the projected image onto said irregular surface.

16. The digitizing projector system, of claim 1, wherein at least one of the one or more surfaces is a noisy surface and whereby the projector projects the projected image onto said noisy surface.

17. The digitizing projector system of claim 1, wherein at least one of the one or more surfaces includes a planar surface and a noisy surface and whereby the projector projects the projected image onto both the planar and the noisy surfaces.

18. The digitizing projector system of claim 1, wherein the digitizer projector system detects at least one edge of the one or more surfaces and whereby the projector projects a projected image onto said at least one edge.

19. The digitizing projector system of claim 1, comprising an image editing feature, whereby a user can change the one or more projected images in color.

20. The digitizing projector system of claim 1, further comprising a motion sensor and a motion detection algorithm that is configured to change at least one of the one or more projected images as a function of a motion sensor input.

21. The digitizing projector system of claim 20, wherein the motion detection algorithm is configured to initiate projection of the projected image as function of a motion sensor input.

22. A digitizing projector system comprising:
a. a housing;
b. a digitizer;
c. a processor;
d. a position calibrating algorithm;
e. a user interface;
wherein the digitizer is coupled with said processor and said processor is configured to produce a 3D digitized object file of an object and identify one or more surfaces of said 3D digitized object file;
f. a projector configured to project an image file onto said one or surfaces to produce a projected image;
g. a user interface configured to position one or more projected images onto the one or more surfaces
wherein the digitizer, projector and processor are ail configured within said housing,
wherein the digitizing projector system is s f-calibrating and wherein the position calibrating algorithm is configured to self-calibrate the projected image as a function of an offset in the 3D digitized object file with a saved 3D digitized object file resulting from the offset position of the digitizing projector system from a previous position of the digitizing projector system used to create the saved 3D digitized object file;
whereby the offset is adjusted for by said position calibrating algorithm such that the projected image overlays correctly on the one or more surfaces;
wherein the user interface displays a view display and a digitized image overlay on a display screen and whereby a user can position and edit one or more image files on the display screen to create a projected image for projection.

* * * * *